Jan. 29, 1963  S. N. SCHLEIN  3,075,745
PULLER DEVICE
Filed April 27, 1960  3 Sheets-Sheet 1

INVENTOR.
SEYMOUR N. SCHLEIN
BY
*J. D. Douglass*
*His* ATTORNEY

Jan. 29, 1963  S. N. SCHLEIN  3,075,745
PULLER DEVICE

Filed April 27, 1960  3 Sheets-Sheet 2

INVENTOR.
SEYMOUR N. SCHLEIN
BY
*J. D. Douglas*
*his* ATTORNEY

INVENTOR.
SEYMOUR N. SCHLEIN
BY J. O. Douglas
ATTORNEY

United States Patent Office 3,075,745
Patented Jan. 29, 1963

3,075,745
PULLER DEVICE
Seymour N. Schlein, University Heights, Ohio, assignor to The Fanner Manufacturing Company, a Division of Textron, Inc., Cleveland, Ohio, a corporation of Rhode Island
Filed Apr. 27, 1960, Ser. No. 24,940
13 Claims. (Cl. 254—51)

This invention relates to apparatus for the attachment of dead ends between anchor rods and cables, guys or the like.

In the installation of power transmission lines, as well as in places where guy wires are used, it is desirable to provide some kind of a device whereby the guy wire may be stretched tight and held in such position while a dead end is being attached. With the advent of dead ends made of helical preformed wires, as shown in Patent No. 2,761,273, which require no other fastening means, the problem became more acute because the end of the guy wire ar cable was almost completely encompassed by the dead end. Since the end of the cable projected beyond the dead end eye, it interfered with the attachment. Furthermore the previous tensioning devices, which consisted mostly of the conventional "come-alongs," had a tendency to misalign the dead end with the cable, which increased the difficulty of final assembly.

By the present invention it is possible to pull a dead end and a cable into a more exact aligned position for attachment by the dead end, with a minimum of offset of the cable relative to the anchor, and in such a manner that the cable and dead end may be quickly and easily assembled in a minimum of time. It eliminates the need for tensioning the cable with a separate clamp and come-alongs or line jacks attached to the cable and anchor rod and which requires that the cable be placed under a higher tension in order to leave it loose enough so that the dead end can be attached and subsequently releasing the auxiliary attachment and trusting in the operator's judgment that sufficient pre-tension has been applied that the ultimate desired tension is on the cable when the tensioning device is released. The present invention allows the cable to be pulled up to the dead end with exactly the right amount of tension, and the dead end to be attached with a minimum of time and effort. It also leaves the area around the cable and anchor rod more free from extraneous obstructions which hinder the operation of the workmen.

When the dead end has been attached to the cable and anchor rod, or whatever the dead end eye is attached to, it may be released and there is no slack to be taken up. Furthermore, the device may all be operated from one spot by one man and reduces the labor difficulty of removing the auxiliary tackle after the job is finished.

The operation of the device is such that no jerks are applied to the dead end or cable when they are released and thus no undue strain placed on insulators which could and often does, cause breakage.

Furthermore there is no bending of the anchor rod or mutilation of the cable or guy at or beyond the point where it is eventually gripped by the dead end and which requires a part of the cable to be discarded.

Still other advantages of the invention, and the invention itself, will become more apparent from the following description of an embodiment of the invention, which is illustrated by the accompanying drawings and forms a part of this specification.

Briefly, the invention contemplates a clamp member that engages with the conductor or guy wire, close to the point where the wire is to enter the eye of the dead end and a pulling device which attaches to the anchor rod near the point of attachment for the dead end. The puller device is connected to the clamp member by a linkage and is pulled toward the puller member bringing with it the guy wire.

Figure 1:
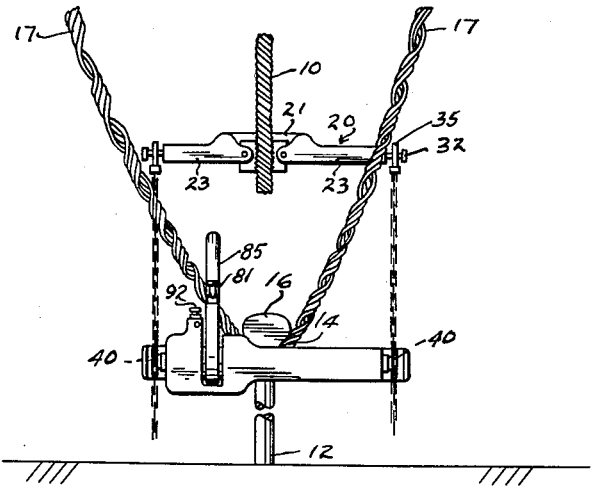
FIG. 1 is an elevational view wherein there is illustrated the end of a wire guy and an anchor rod with the apparatus of my invention in place and wherein the dead end is ready to be applied to the cable.
Figure 2:
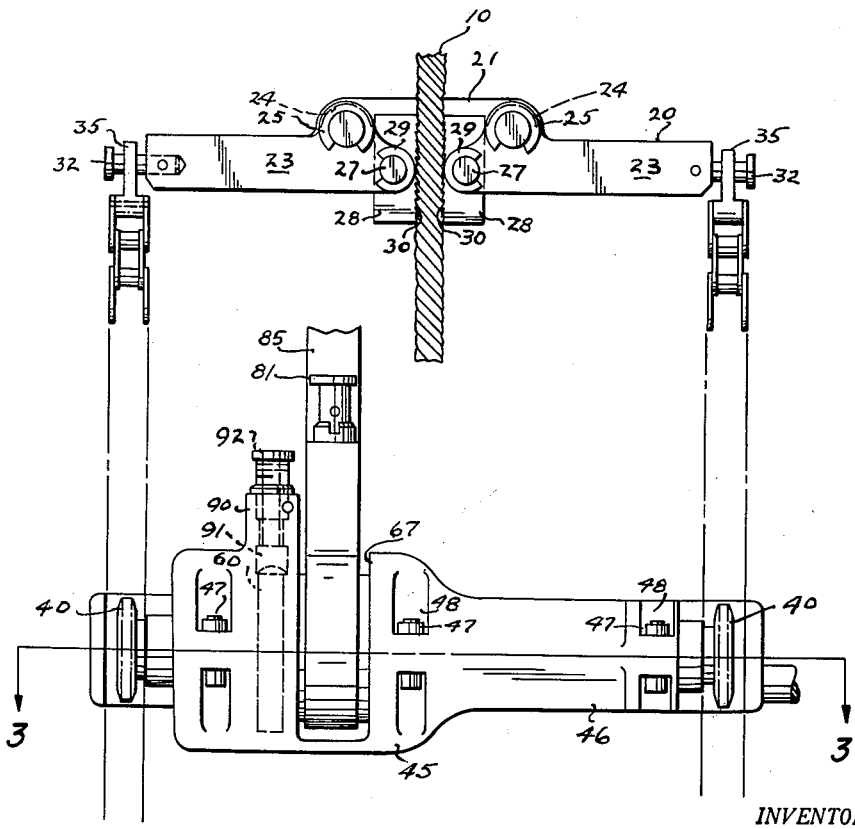
FIG. 2 is an enlarged plan view of the apparatus with the anchor rod omitted and the operating handle broken off.

Referring now to the drawings, throughout which like parts have been designated by like reference characters, and particularly to FIGS. 1 and 2, it should be understood that it is desirable to bring a conductor or guy wire 10, which may comprise a stranded wire, close to the end of an anchor rod 12 which may be embedded in the ground. It is then held in this position and under tension while a dead end, which comprises a bight portion 14, which later forms the eye, is passed through the eye 16 of the anchor rod, and the legs 17 are wrapped around the end of the cable 10. In this instance the cable 10 has been shown as severed, spaced a short distance from the eye, in the interest of clarity of the drawings. This cable would not necessarily have to be severed but could continue on to some indeterminate length, since due to the manner of operation of the device the excess length of cable does not interfere with its operation.

The guy wire 10 is gripped by a clamp member or means indicated in its entirety by the numeral 20. It comprises a central yoke member 21 having a pair of spaced parallel arms 22 which serve as the pivot point for a pair of outwardly extending clamp operating means in the form of jaw arms 23. The arms 22 are preferably formed by pins which are inserted in bores in the yoke. The jaw arms 23 are provided with ears 24, disposed to one side of the center line of the arms 23 and secured on the pivot pin 22 by C rings 25. The arms 23 project inwardly toward each other, slightly beyond the pivot pins 22 and are provided with forks 26 on their ends between which are pivotally mounted on a pin 27 the wire gripping jaw members 28. The pins are locked in place by C rings 29 on opposite ends of the pins.

Figure 4:
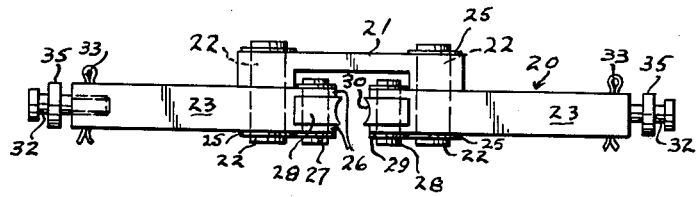
FIG. 4 is a view of the clamp member rotated 90° from that of FIG. 2 with the cable omitted.

As best shown in FIGS. 2 and 4, the jaws 28 each comprise an elongated rectangular block having transverse teeth 30 which are inwardly curved to provide semi-circular gripping members. The curvature of the teeth is such that a maximum circumferential area of the cable may be engaged by the jaws. If desired, jaws having a curvature to provide maximum engagement with any particular size of cable or wire may be provided and substituted for each other. In many instances the teeth could be eliminated and plain surfaces provided for gripping the cable.

The ends of the arms 23 are provided with chain pins 32, which are simply headed pins, the ends of which are disposed in blind holes in the ends of the bars and locked in place by cotter keys 33. The projecting ends of the pins provide a bearing or attaching member for traction means in the form of link chains 35. It is apparent that suitable hooks or other types of fastening means could be provided and be equally effective.

The chains are connected to and pulled by traction engaging and moving means in the form of sprockets 40 carried by the pulling device or tractor means. It will be appreciated that other types of attachments to the cable could be provided and that the one described is for the purpose of clarifying the invention and that the invention is not to be limited to the particular cable clamp illustrated.

The sprockets 40 are keyed onto the ends of a shaft 42 by Woodruff keys 43. The shaft is rotatably mounted in a housing which includes an enlarged part 45 for housing the ratchet and clutch mechanism, and a smaller diameter extension 46 which provides a support for the shaft. The housing is preferably made in two halves which are bolted together by bolts 47. The housings are recessed at points 48 spaced from the meeting edges so that the bolts do not extend beyond the periphery of the housing.

Figure 3:
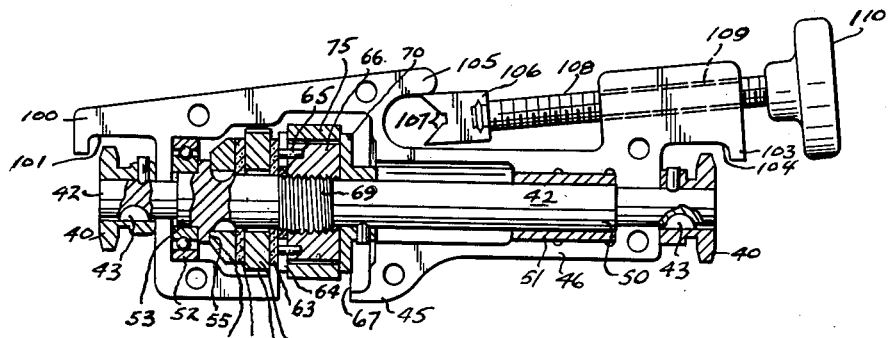
FIG. 3 is a section taken on the line 3—3 of FIG. 2, looking in the direction of the arrows.

As best shown in FIG. 3, the shaft is provided with an enlarged portion 50 and is journalled in an antifriction bearing 51, mounted in seats formed in the housing. The right end of the shaft projects beyond the small end of the housing and carries the sprocket 40.

In the left and enlarged end of the housing there is provided a ball bearing 52 which is seated in the housing and the inner race of which is pressed on an enlarged shoulder 53 of the shaft. The end of the shaft projects beyond the enlarged end of the housing and carries the other sprocket 40.

Inwardly of the bearing 52 the shaft is provided with another shoulder 55 and a first driven clutch member 56 is keyed to the shaft at that point by Woodruff keys. This clutch member may have a suitable lining 57 secured to its face. Adjacent the lining 57 and loosely disposed on the shaft is a friction means in the form of circular ratchet gear 60 having ratchet teeth 61 on its periphery. The ratchet member side face is disposed for frictional engagement with the lining 57. The other side face of the ratchet member is disposed adjacent a second clutch lining 63 secured to a plate 64 which is pinned by pins 65 to the ratchet drive gear 66. The housing is provided with an opening 67 at this point for reception of the ratchet operating handle.

The ratchet drive gear is internally threaded and is mounted on an externally threaded part 69 of the shaft. The other side of the ratchet gear engages with a thrust flange 70 secured to the shaft.

Figure 5:
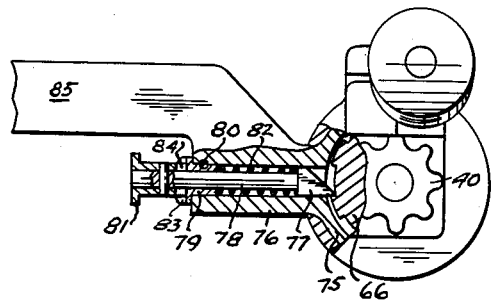
FIG. 5 is an end elevational view taken from the right end as viewed in FIG. 3 with certain parts broken away and shown in section.

The ratchet gear 66 is driven by a ratchet drive member, which includes a ring 75, FIG. 5, which surrounds the gear 66 in close but sliding engagement with the teeth. At one side of the ring 75 there is provided a radially projecting housing 76 having a bore therein which opens through the ring. In the housing is a pawl 77 from which a stem 78 extends through the bore and through a bushing 79. The bushing is locked in the bore by a pin 80. The end of the stem is provided with an operating knob 81. A spring 82 between the bushing 79 and the end of the body of the pawl holds the pawl pressed inwardly. The bushing is provided with slots 83 and the skirt of the knob 81 is provided with tongues 84 which may project in the slots. Thus the pawl may be rotated by the knob when the knob is pulled outward to disengage the pawl or position it for engagement with the ratchet gear teeth, permitting the ratchet to operate in either direcion. At one side of the housing 76 there is provided a ratchet operating handle 85.

Similarly the main housing is provided with a boss 90 for housing a similar ratchet pawl 91 which engages with the teeth 61 of the ratchet gear 60. An operating knob 92 is provided for controlling the operation thereof.

As best shown in FIG. 3, the left end of the housing is provided with a chain guide which comprises a projection 100 extending over the lefthand sprocket 40 and having a channel shaped surface 101 opposite to and overhanging the sprocket. The bottom of the channel is sufficiently close to the sprocket to hold the chain on the sprocket. Likewise, the right end of the housing is provided with a similar boss 103 having a similar guide 104.

At one side of the enlarged housing 45 the housing is formed with an anchor rod clamping means including an engaging hook or channel 105. The anchor rod is engaged by the hook and the puller housing is held in place on the anchor rod by a pressure member 106 which has a V-shaped anchor rod engaging part 107. The pressure member is operated by a screw 108 having an end rotatably secured in the member 106 and which is screw threaded through the threaded bore 109 in the boss 103 on the righthand end of the housing. An operating knob 110 is provided for the screw.

In operation, the puller mechanism 41 is secured to the anchor rod by passing the hook 105 over the rod near the base of the eye and tightening the pressure member 106 to hold the puller in place. It will be appreciated that the device is not necessarily limited to the gripping of anchor rods since it could as well be used on another section of a conductor where two conductors are to be brought together and spliced, or connected to another dead end previously installed where, two dead ends are to be brought together and secured to each other to provide a link.

Regardless of where the device is used, once it is attached the main ratchet is rotated so that the ratchet wheel 66 is moved on the thread 69 to the righthand position, as viewed in FIG. 3. This assures that the clutch mechanism 56, 57, 60, 63 and 64 is disengaged. The shaft 42 is now free to rotate along with the sprockets and the chains 35 with the cable chain member 20 may now be pulled out to the desired spaced relation from the puller housing, within the limits of the length of the chains.

The cable, guy wire or transmission line which is to have a dead end attached thereto, or which is to be brought into end engagement with smaller piece of cable for splicing, is inserted between the jaws 28. Due to the swivel action of the arms 23 the cable is automatically gripped by the jaws 28 and as much slack taken out of the cable as is desired by the workman.

The apparatus is now installed and ready to pull the cable to the anchor rod. In the interest of brevity, the device will be described as attaching a dead end to a cable and an anchor rod, but, it will be apparent that it can be used for any of the other purposes mentioned. The ratchet pawl is now positioned so that when the handle is operated the main ratchet wheel will move in such a direction that it is moved to the left on the shaft 42 due to the threads 69. This causes the clutch plate 64, the lining 63, the ratchet plate 60, the lining 57 and the end clutch member 56 to be forced together. Eventually the pressure between the members mentioned will be sufficient that the shaft 42 will be rotated along with the sprockets 40.

The chains will then be pulled toward the puller housing, and being secured to the ends of the levers 23 will cause them to rotate about their pivots 22, forcing the cable engaging jaws into firm gripping contact with the cable and pulling the cable toward the housing. As soon as sufficient tension is provided by the hook 105 on the anchor rod, V block 106 may be loosened.

The dead end can be passed through the eye of the anchor rod 12 at any time during the above operations. In some instances it has been found that greater freedom of movement is realized if the dead end is placed in position after the apparatus is in position and the parts are pulled nearly to or to their final positions. By this method of operation the area is left free from obstruction which would otherwise interfere with the actions of the workman.

In either event, the cable may be pulled toward the eye, the handle and the main ratchet 66 causing the rotation of the sprockets 40 and the auxiliary ratchet 91—60 acting as a holding ratchet, until the cable is tightened the desired amount at which time the clamp 20 may or may not be close to the puller, depending on how tight the cable was tightened by hand and how much tension is desired on the cable. It is apparent that the alignment of the cable with the eye is such that they have a common axis and that the pull on the cable is directly toward and to the eye of the anchor rod.

Assuming that the clamp is brought into close proximity to the eye of the anchor, then the dead end may be applied in the usual manner, except that due to the alignment of the cable with the anchor it is much easier and quicker to apply.

Once the dead end is applied, the main ratchet is reversed, then, since the auxiliary or holding ratchet is still engaged, the main ratchet wheel may be turned to cause it to rotate in the other direction on the threads 68 which causes a gradual loosening of the clutch elements. This reverse movement is continued until the sprockets are allowed to turn gently, causing the cable to be slowly released and the dead end to seat itself and be pulled by the cable into its final position.

Eventually the chains 35 become slack and the device may be removed from the cable and anchor.

As previously stated, other means than that best shown specifically in FIG. 3, may be used to hold the puller in position on the anchor rod at the start of the operation.

Figure 6:
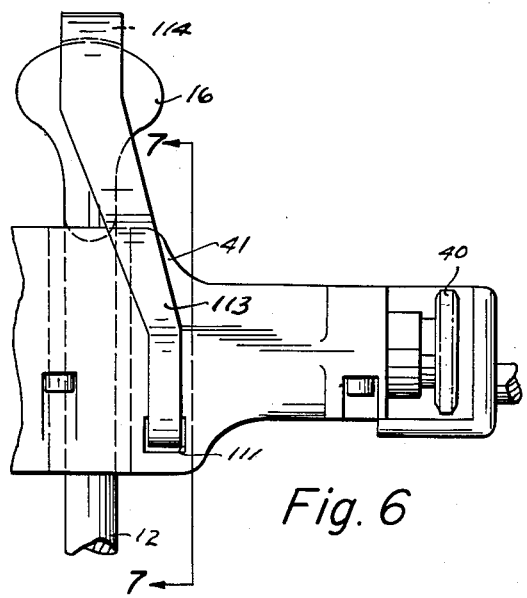
FIG. 6 is a fragmentary elevational view showing a modified form of anchor rod clamp.
Figure 7:
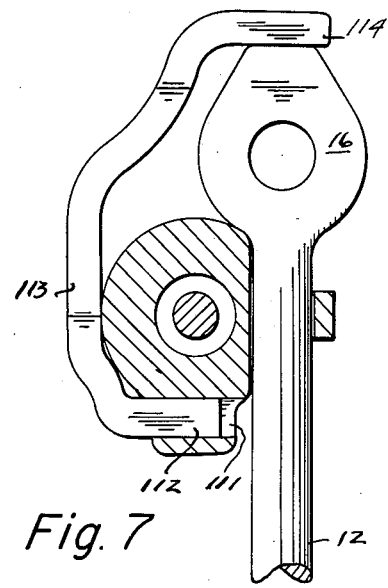
FIG. 7 is a section taken from the line 7—7 of FIG. 6.

FIGS. 6 and 7 show such a means. The housing 41, to one side of the ratchet opening 67, is provided with a square opening 111 which receives the square end 112 of a generally C-shaped keeper 113. The body of the keeper extends toward and inclines to the left (FIG. 6) so that it is opposite to the anchor rod eye 16, at the same time it extends backward toward the eye and is provided with a top portion 114 which extends over and engages with the top of the eye (FIG. 7).

In operation the puller is engaged with the anchor rod below the eye 16, with the shank of the anchor rod seated in the recess provided at 105. It is then moved up along the rod until the body of the eye prevents any further upward movement and then the keeper is placed in position with the end 112 in the recess 111 and with the top portion 114 overlying the eye 16. This being done, the puller remains in position while the other connections to the cable are being made.

As soon as tension is placed on the cable, at which time the puller is pulled into more tight engagement with the eye, the keeper may be removed and laid aside for the remainder of the operation.

Figure 8:
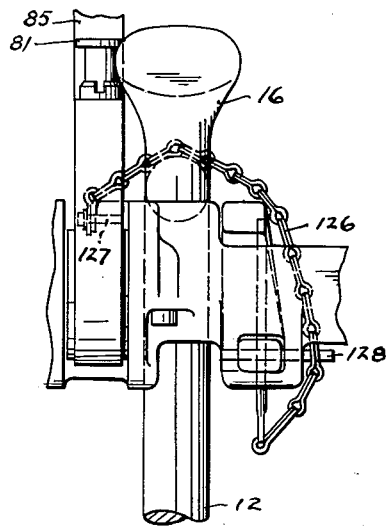
FIG. 8 is a view similar to FIG. 6 of another embodiment of the invention.
Figure 9:
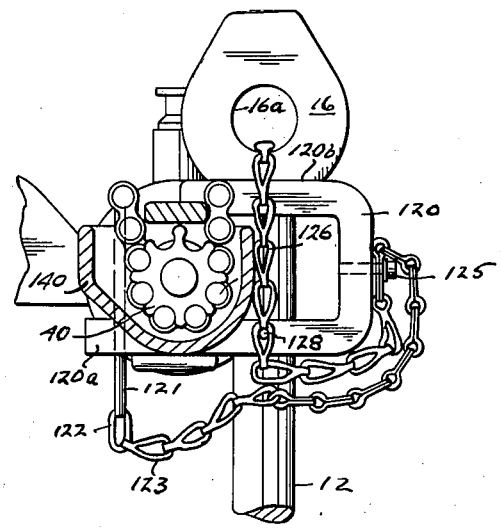
FIG. 9 is an end elevational view thereof.

Still another embodiment of the invention is illustrated in FIGS. 8 and 9, wherein a chain type of keeper is illustrated and which is desirable since it allows for greater flexibility of attachment to heads of rods which may vary in size. It also has an advantage that there are no separate parts which may be lost.

In this instance, the same type of square opening 111 is provided and a keeper member 120 which has a lower leg 120a of square cross section which is inserted through the opening, being held in place by a pin 121 having an eye 122. The pin 121 extends through the leg 120a and upward alongside the housing and is held in place by being a relatively close fit of the pin in the opening in the leg. The leg then extends outward and upward and is provided with a top leg 120b in spaced parallel relation to the lower leg. The pin 121 is connected by a chain 123 to a cap screw 125 and therefore when removed cannot be lost.

The puller is held onto the anchor rod, having been placed thereon in the manner previously described, by a chain 126, an end of which is held to the housing by a lock pin 127, the chain extending through the opening 16a of the eye and which then extends downward, and one of the openings in the chain being linked over a pin 128 which extends through the lower leg 120a of the keeper member. This chain is also prevented from being lost by being connected to the cap screw 124.

It will be seen, that due to the flexibility of the chain the device may be connected to anchor rods of various sizes.

It will be appreciated that the same opening in the housing for holding the chain type keeper may also be used for the keeper of FIGS. 6 and 7 and that in many instances both types will be available to the user.

In operation, the puller means would first be attached to the anchor rod. Then the clutch, would be released releasing the chains and allowing the clamp to be moved out from the puller the desired distance. Next the clamp means would be engaged with the cable, at this stage the cable may be slid between the clamp jaws, removing a great deal of the slack. After a certain amount of the tension is placed on the cable, the jaws will automatically grip and hold the cable. Then the ratchet is operated by means of the handle 85 causing the clutch to be gradually engaged and the sprockets 40 to be revolved pulling the chains and the clamp with the cable toward the anchor eye. At some time during the procedure the dead end is inserted in the eye with the bight engaged with the eye. The desired amount of tension being placed on the cable the legs of the dead end may then be wrapped around the cable beyond the clamp.

Once the dead end is in position, the ratchet is reversed and operated in the opposite direction.

FIGS. 6 and 9, also, illustrate a variation in the chain guide or keeper wherein the guide 140 not only holds the chain against escape from the sprocket 40 but provides a socket in which the sprocket is disposed thus prevents foreign materials from getting in between the sprocket and the chain and also preventing the workman's clothing from being caught therein.

It will be particularly noted as best illustrated in FIG. 9, that the tensioned part of the chain is very close to the center line of the anchor rod and that therefor this assists in maintaining alignment between the cable end and the anchor rod.

It will thus be seen that I have provided a means for pulling a cable up close to an anchor rod wherein the cable may be easily and quickly attached to the clamp and the excess slack removed from the cable prior to the final tensioning operation. The puller element is quickly and easily attached to the anchor rod and is temporarily held in position during the time the cable is being connected to the clamp. The operation may easily be performed by one man and all performed from the ground with a minimum of equipment. The cable is not damaged and is brought into close and exact alignment with the anchor rod. Substantially the exact amount of tension is applied to the cable and when the puller is released the cable is released gently without any jerks.

Having thus described the invention, in an embodiment thereof, I am aware that numerous and extensive departures may be made therefrom without departing from the spirit or scope of the invention as defined in the appended claims.

I claim:

1. A puller device comprising a housing, a shaft extending through the housing and having sprockets on the ends of the shaft and ratchet means for rotating said shaft and sprockets, separate chain means engaged by each of the sprockets, cable gripping clamp means having spaced apart clamp operating means connected to the separate ends of said chains and arranged to be drawn by said chains into proximity with said housing.

2. A device as described in claim 1, wherein said spaced apart clamp operating means is comprised of a pair of lever arms pivotally mounted intermediate their ends and friction gripping shoes are pivotally mounted on the ends of the lever arms opposite to the ends to which the chains are attached.

3. A device for pulling a first and second member toward each other comprising a first clamp member for attachment to one of said members, a tractor member arranged to be supported by said second member, traction means connected between the clamp member and the tractor member, means on the tractor member for moving said traction means to pull the clamp member toward the tractor member, said clamp member including a support, a pair of levers pivotally mounted on the support intermediate their ends, said traction means comprising a pair of flexible members one of which is connected to one lever arm and the other to the other lever arm, friction gripping shoes pivotally mounted on the ends of the lever arms opposite the ends to which the traction means is secured, said gripping shoes being arranged to grip said first member.

4. A traction device for use in conjunction with a cable clamping means having spaced apart clamp operating levers with traction means attached thereto, said traction device comprising a housing, a shaft rotatably supported by the housing and having ends extending beyond the confines of the housing with traction engaging and moving means disposed thereon, connector means on said housing for connecting the housing to an anchor rod or the like, means to rotate said shaft including a ratchet wheel, said shaft having a threaded portion and said ratchet wheel being threaded on said portion, ratchet means surrounding the ratchet wheel and having a handle extending through an opening in said housing and reversible pawl means carried by the ratchet means for engagement with the ratchet wheel, a driven clutch member secured to said shaft and having a friction face toward said ratchet wheel and friction means interposed between said clutch member and the ratchet wheel for transmitting frictional driving forces from the ratchet wheel to said clutch member.

5. A device as described in claim 4, wherein said friction means has a toothed surface and reversible pawl means is carried by said housing in engagement with said toothed surface.

6. A device for pulling a pair of spaced flexible traction means for pulling a cable toward an anchor rod or the like comprising a housing, a shaft rotatably journalled in the housing and having spaced apart sprockets carried thereby, means for rotating said shaft comprising a first clutch member disposed on said shaft in threaded engagement therewith, a driven member secured to said shaft in spaced relation to said clutch member, friction coupling means between said driven member and said clutch member, and reversible ratchet means in operative engagement with said clutch member.

7. A device as described in claim 6, wherein reversible pawl means is provided for engagement with said friction coupling.

8. A device as described in claim 6, wherein hook means is provided on the housing midway between said sprockets and clamp means is provided for cooperation with the hook means to clamp the housing to a member to which it is to be attached.

9. A device as described in claim 8, wherein said clamp means comprising a screw threaded member supported by the housing and a V block is carried thereby for engagement with a member engaged by the hook.

10. A device as described in claim 6, wherein said housing is provided with an anchor rod receiving portion in which the shank of an anchor rod may be seated and a threaded stem is supported by the housing and has a V block on the end for clamping the shank of the anchor rod in said anchor rod receiving portion of the housing.

11. A device for pulling a cable up to an anchor rod wherein clamp means is connected to the cable and puller means is attached to the anchor rod and flexible traction means is connected between the clamp means and the puller means, said puller means comprising a housing, a shaft rotatably journalled in the housing and having ends projecting beyond the housing with sprockets on the end for engagement with the traction means, means for operating said shaft, said housing being formed with a seat for receiving the shank of the anchor rod and keeper means cooperating with said housing and the seat and in engagement with the anchor rod for holding the housing on the anchor rod.

12. A device as described in claim 11, wherein said housing is provided with a socket and said keeper means comprises a first portion for engagement in the socket and a second portion extending up and over the housing into engagement with the eye end of the anchor rod.

13. A device as described in claim 11, wherein said housing is provided with a socket and a C-shaped member is provided which has a portion extending into said socket and alongside the anchor rod to hold it in said seat and a chain is provided secured to the housing and extending through an eye of the anchor rod and adjustably secured to said C-shaped member.

References Cited in the file of this patent

UNITED STATES PATENTS

| | | |
|---|---|---|
| 903,763 | Pedersen | Nov. 10, 1908 |
| 936,749 | Wheeler et al. | Oct. 12, 1909 |
| 1,072,599 | Gibbons | Sept. 9, 1913 |
| 2,044,483 | Neher | June 16, 1936 |
| 2,670,924 | Baty | Mar. 2, 1954 |
| 2,725,618 | Nygaard | Dec. 6, 1955 |